United States Patent
Ootake

(10) Patent No.: US 9,605,982 B2
(45) Date of Patent: Mar. 28, 2017

(54) ROTARY ENCODER HAVING PERIODIC AND NON-PERIODIC TRACKS

(71) Applicant: FANUC CORPORATION, Minamitsuru-gun, Yamanashi (JP)

(72) Inventor: Nobuyuki Ootake, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/952,104

(22) Filed: Nov. 25, 2015

(65) Prior Publication Data

US 2016/0153810 A1 Jun. 2, 2016

(30) Foreign Application Priority Data

Nov. 28, 2014 (JP) ................................. 2014-242196

(51) Int. Cl.
*G01D 5/34* (2006.01)
*G01D 5/347* (2006.01)

(52) U.S. Cl.
CPC ....... *G01D 5/34792* (2013.01); *G01D 5/3473* (2013.01)

(58) Field of Classification Search
CPC ............. G01D 5/34792; G01D 5/3473; G01D 5/34707
USPC .................................................. 250/231.13
See application file for complete search history.

(56) References Cited

U.S. PATENT DOCUMENTS

| | | | | |
|---|---|---|---|---|
| 2007/0034786 A1* | 2/2007 | Oka | ........................ | G01D 5/36 250/231.13 |
| 2012/0205527 A1 | 8/2012 | Yoshida | | |
| 2012/0217384 A1* | 8/2012 | Nagura | ............. | G01D 5/34746 250/231.13 |

FOREIGN PATENT DOCUMENTS

| | | |
|---|---|---|
| JP | H11-287671 A | 10/1999 |
| JP | 2003-254785 A | 9/2003 |
| JP | 2004325231 | 11/2004 |
| JP | 200590997 | 4/2005 |
| JP | 2012242389 | 12/2012 |
| JP | 2013195071 | 9/2013 |
| WO | WO 2005/050141 A1 | 6/2005 |
| WO | 2012108078 | 8/2012 |

* cited by examiner

*Primary Examiner* — Thanh Luu
(74) *Attorney, Agent, or Firm* — RatnerPrestia

(57) ABSTRACT

In a rotary encoder of the present invention, each track of a rotary disk has transmitting parts and non-transmitting parts alternately arranged in the circumferential direction. Each non-transmitting part has a plurality of projecting parts which are arranged side by side in the circumferential direction. Each projecting part has a pair of reflecting surfaces which retro reflect incident light toward a light emitting part. A plurality of tracks include a periodic track where transmitting parts and non-transmitting parts are arranged with a periodic pattern and non-periodic tracks where transmitting parts and non-transmitting parts are arranged in a non-periodic pattern. The periodic track and non-periodic track are respectively arranged at positions in the radial direction where further reflected light at the light emitting part after retro reflection at the reflecting surfaces of the non-periodic track will not enter the periodic track.

5 Claims, 5 Drawing Sheets

ROTARY ENCODER HAVING PERIODIC AND NON-PERIODIC TRACKS

BACKGROUND OF THE INVENTION

1. Field of the Invention

The present invention relates to an optical type rotary encoder for detecting a rotational angle of a rotatable body.

2. Description of the Related Art

In the field of industrial machinery, an optical type rotary encoder has been used as a sensor for detecting a rotational angle of a drive shaft of an electric motor or a rotatable body which is driven by the electric motor. In general, optical type rotary encoders are classified into transmission types which use modulated light which was transmitted through a rotary disk as the basis to detect the rotational angle of a rotatable body, and reflection types which use modulated light which was reflected at a rotary disk as the basis to detect the rotational angle of a rotatable body.

In general, a transmission type rotary encoder comprises a light emitting diode, a rotary disk which is provided with a plurality of optical tracks for converting emitted light from the light emitting diode to modulated light, a light receiving element which receives the modulated light from the rotary disk and converts it to an electrical signal, and a circuit part which processes the electrical signal from the light receiving element to calculate the rotational angle of the rotatable body. Further, each of the above-mentioned plurality of optical tracks has a structure in which parts with a light passing ability (light transmitting parts) and parts with a light interrupting ability (non-transmitting parts) are alternately arranged along an extension direction. Such a structure of an optical track is, for example, formed by etching a glass sheet on which chrome has been vapor deposited. That is, the parts of the glass sheet having the chrome layer removed by etching form the light transmitting parts of the rotary disk while the parts of the glass sheet still having the chrome layer form the non-transmitting parts of the rotary disk.

JP H11-287671A, unlike the above example, discloses forming non-transmitting parts by providing a plastic rotary disk having a light transmitting ability with a plurality of V-grooves. More specifically, in the rotary encoder of JP H11-287671A, the non-transmitting parts are formed so that the incident angle of light entering the slanted surfaces of the V-grooves is equal to or larger than a critical angle, and therefore the light which reaches the slanted surfaces of the V-grooves is completely reflected. If the above-mentioned structure of non-transmitting parts is employed, it is possible to eliminate a vapor deposition step and an etching step, and thus possible to produce the rotary disk in an inexpensive and easy manner. However, in the rotary encoder of JP H11-287671A, the emitted light from the light emitting diode is retro reflected at the V-grooves of the non-transmitting parts, and therefore the retro reflected light at the non-transmitting parts may be further reflected at the same light emitting diode. The further reflected light at the light emitting diode may travel a route which is in linear symmetrical with the route of the incident light to the rotary disk, so as to exit from light emitting diode. Usually, the rotary disk of a rotary encoder has a plurality of optical tracks which are arranged concentrically, and therefore retro reflected light at the V-groove of a certain optical track is liable to enter another optical track after being reflected at the light emitting diode. If retro reflected light at a certain optical track enters another optical track in this way, a modulated signal corresponding to the optical track may be superposed, and therefore the detection precision of the rotary encoder may be deteriorated.

In relation to this, JP2003-254785A proposes a signal processing system which is provided with a function of calculating and correcting periodic error in the detection precision of an encoder. However, the signal processing system of JP2003-254785A cannot calculate non-periodic error. Therefore, the signal processing system of JP2003-254785A can deal with deterioration of detection precision due to retro reflected light at an optical track which has a periodic pattern, but cannot deal with deterioration of detection precision due to retro reflected light of an optical track which has a non-periodic pattern. Here, a "periodic pattern" means a pattern where light transmitting parts and non-transmitting parts are alternately arranged at the same duty ratio over the entire length of an optical track. FIG. 6 is a schematic view which shows a periodic pattern of light transmitting parts L and non-transmitting parts N. Further, a "non-periodic pattern" means all patterns except for those which correspond to the above periodic pattern. FIG. 7 to FIG. 9 are schematic views which show non-periodic patterns of light transmitting parts L and non-transmitting parts N. The white parts in FIG. 6 to FIG. 9 represent the light transmitting parts L, while the hatched parts represent the non-transmitting parts N.

Further, WO2005/050141A1 proposes an encoder which controls the direction of reflected light by setting the orientation of a V-groove to 90°+α. However, if the encoder employs a light source which has a number of light reflecting surfaces such as an LED (light emitting diode) which is sealed inside a metal can package, the distance from a die pad to a light emitting point is relatively large (for example, about 2 mm), and therefore the above α has to be relatively large (see WO2005/050141A1, formula (4)). For this reason, it is actually difficult to suppress the α value to 3° or less as recommended in WO2005/050141A1. Further, WO2005/050141A1 proposes arranging a part of the rotary disk with no optical track at a location of the rotary disk which is in linear symmetrical with a non-transmitting part with respect to the optical axis of the light emitting diode. However, according to the above arrangement, the rotary disk may have larger areas which cannot be provided with optical tracks, and therefore it is not possible to make effective use of the regions illuminated by the light emitting diode.

SUMMARY OF INVENTION

A rotary encoder which can suppress deterioration of detection precision due to retro reflected light at a non-transmitting part of a rotary disk has been sought.

According to a first aspect of the present invention, there is provided a rotary encoder comprising a rotary disk which has a rotation axis, and a light emitting part which emits light toward the rotary disk, wherein the rotary disk has a plurality of tracks which extend concentrically about the rotation axis, each of the plurality of tracks has light transmitting parts which transmit incident light to the rotary disk and non-transmitting which do not transmit incident light to the rotary disk, the light transmitting parts and the non-transmitting parts being arranged alternately in a circumferential direction about the rotation axis, the non-transmitting parts have pluralities of projecting parts which are arranged along the circumferential direction of the rotary disk, each of the plurality of projecting parts having a pair of reflecting surfaces which retro reflect incident light to the rotary disk toward the light emitting part, the plurality of tracks include a periodic track where the light transmitting parts and the non-transmitting parts are arranged in the circumferential direction with a periodic pattern and a non-periodic track where the light transmitting parts and the non-transmitting parts are arranged in the circumferential direction with a non-periodic pattern, and the periodic track and the non-periodic track are arranged in a radial direction of the rotary disk at positions where further reflected light at the light emitting part after retro reflection at the reflecting surfaces of the non-periodic track will not enter the periodic track.

According to a second aspect of the present invention, there is provided a rotary encoder according to the first aspect, wherein the light emitting part has a housing which holds a light emitting diode, and the housing has a surface which symmetrically reflects retro reflected light at the reflecting surfaces of the non-periodic track with respect to an optical axis of the light emitting part.

According to a third aspect of the present invention, there is provided a rotary encoder according to the first or second aspect, wherein the plurality of tracks further include a second non-periodic track where the light transmitting parts and the non-transmitting parts are arranged in the circumferential direction by a non-periodic pattern, the periodic track is arranged in the radial direction between the non-periodic track and the second non-periodic track, and the periodic track and the second non-periodic track are arranged in the radial direction at positions where further reflected light at the light emitting part after retro reflection at the reflecting surfaces of any one of the non-periodic track and the second non-periodic track will not enter the periodic track.

According to a fourth aspect of the present invention, there is provided a rotary encoder according to the third aspect, wherein the periodic track, the non-periodic track, and the second non-periodic track are arranged in the radial direction so that further reflected light at the light emitting part after retro reflection at the reflecting surfaces of any one of the non-periodic track and the second non-periodic track will enter the other of the non-periodic tracks.

According to a fifth aspect of the present invention, there is provided a rotary encoder according to any one of the first to fourth aspects, wherein the periodic track is an optical track for an incremental signal, and the non-periodic track is an optical track for an absolute signal.

According to a sixth aspect of the present invention, there is provided a rotary encoder according to any one of the first to fifth aspects, wherein the rotary disk is formed from a plastic material which has a light transmitting ability.

These and other objects, features, and advantages of the present invention will become clearer with reference to the detailed description of an illustrative embodiment of the present invention which is shown in the mounted drawings.

DETAILED DESCRIPTION OF EMBODIMENTS

Figure 1:
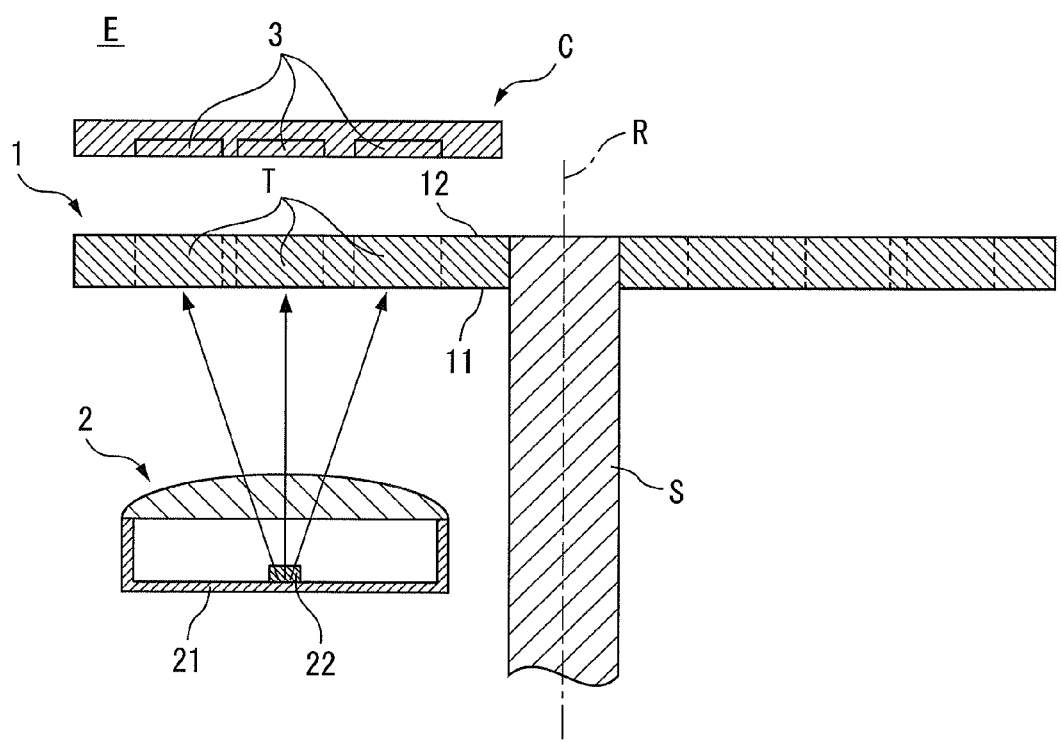
FIG. 1 is a cross-sectional view of a rotary encoder of one embodiment of the present invention.

Below, an embodiment of the present invention will be explained in detail with reference to the drawings. In the drawings, similar component elements are assigned similar reference notations. Note that the following explanation does not limit the technical scope of the inventions which are described in the claims or the meaning of terms etc.

Referring to FIG. 1 to FIG. 5, a rotary encoder of one embodiment of the present invention will be explained. The rotary encoder of the present embodiment is an optical type sensor which detects the rotational angle of a drive shaft of an electric motor or a rotating shaft which is connected to another type rotatable body.

In particular, the rotary encoder of the present embodiment is a light transmitting type rotary encoder, and is provided with a light emitting diode which faces a bottom surface of a rotary disk and light receiving elements which face a top surface of the rotary disk. FIG. 1 is a cross-sectional view along the plane including the rotation axis of an illustrative rotary encoder E of the present embodiment.

As shown in FIG. 1, the rotary encoder E of the present example has a rod-shaped rotating shaft S which can be coupled with a drive shaft of an electric motor or another type rotatable body (not shown), and a rotary disk 1 which is attached concentrically to end part of the rotating shaft S. The rotary disk 1 of the present example has a bottom surface 11 which faces a light emitting part 2 and a top surface 12 which is positioned at an opposite side to the bottom surface 11 and is designed to rotate together with the rotating shaft S about a predetermined rotation axis R. The bottom surface 11 and top surface 12 of the rotary disk 1 extend vertically with respect to the rotation axis R. The rotary disk 1 of the present example can be formed from various plastic materials which have a light transmitting ability. The detailed structure of the rotary disk 1 of the present example will be explained later.

Further, the rotary encoder E of the present example has a light emitting part 2 which is arranged below the rotary disk so as to emit light toward the bottom surface 11 of the rotary disk 1, a circuit part C which is arranged above the rotary disk 1, and a plurality of light receiving parts 3 which are assembled in the circuit part C so as to face the top surface 12 of the rotary disk 1. The light emitting part 2 of the present example is provided with a metal housing 21 generally called a "metal can package" and a red LED or infrared LED or another type light emitting diode 22 which is arranged at the inside of the housing 21.

The circuit part C of the present example has the form of a circuit board which extends vertically to the extension direction of the rotating shaft S. In addition to the plurality of light receiving parts 3, various electronic devices, integrated circuits, and interconnects for connecting these devices and circuits are assembled in the circuit part C of the present example. The number of light receiving parts 3 of the present example is equal to the number of ring-shaped tracks T of the rotary disk 1 explained later. Each of these light receiving parts 3 is provided with a photodiode or photo transistor or other light receiving element (not shown). The plurality of light receiving parts 3 are arranged side by side in a direction vertical to the rotation axis R (that is, in the left-right direction in FIG. 1) so as to be able to receive transmitted light through the plurality of ring-shaped tracks T.

Figure 2:
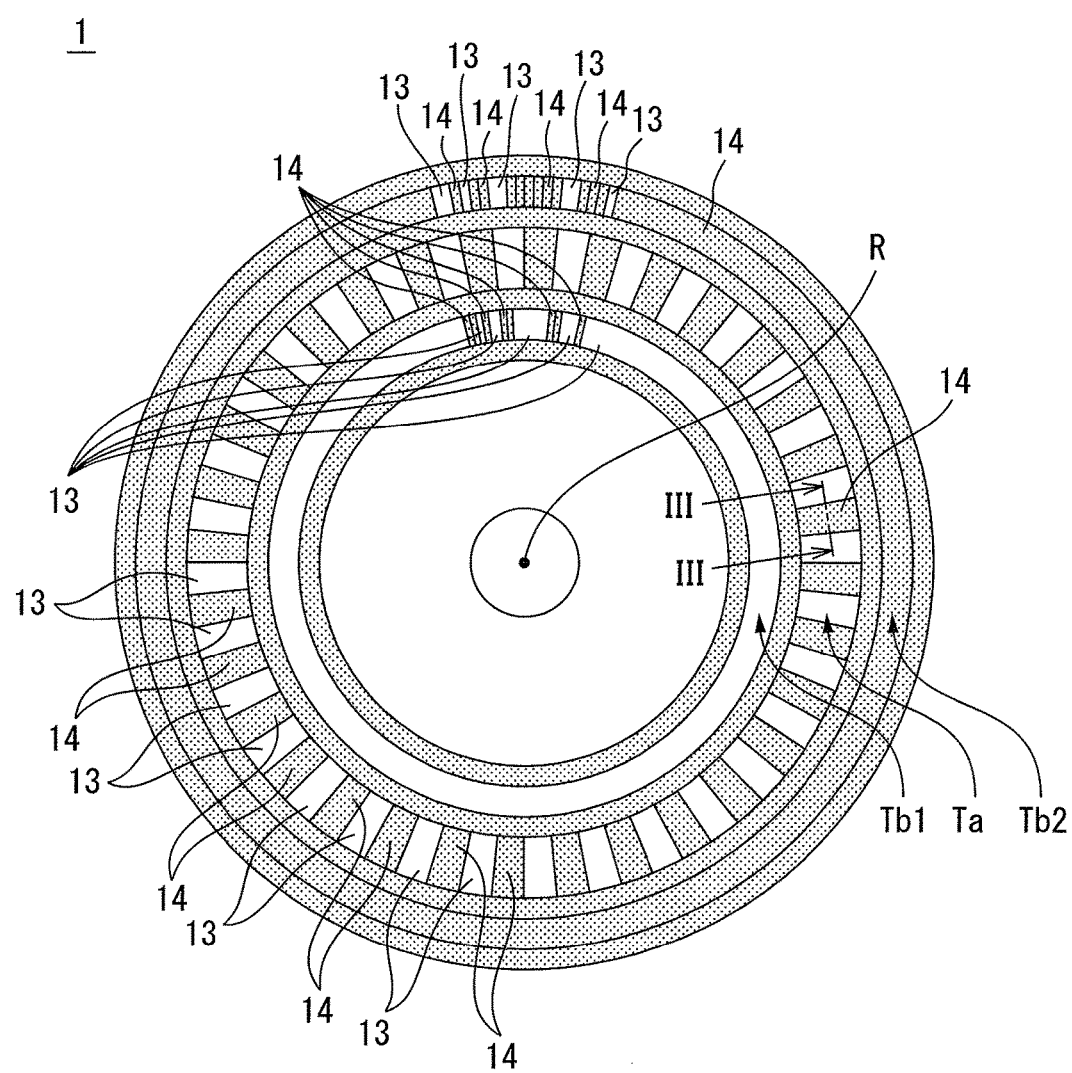
FIG. 2 is a top view of a rotary disk in FIG. 1.

Next, the detailed structure of the rotary disk 1 of the present example will be explained. As shown in FIG. 1, the rotary disk 1 of the present example has a plurality of ring-shaped tracks T which extend concentrically about the rotation axis R. In particular, the rotary disk 1 of the present example has three ring-shaped tracks with different radial sizes. FIG. 2 is a top view of the rotary disk 1 in FIG. 1. In FIG. 2, the three tracks T in FIG. 1 are indicated by the notations Ta, Tb1, and Tb2. As shown in FIG. 2, each of the three tracks Ta, Tb1, Tb2 has a plurality of light transmitting parts 13 which transmit incident light to the rotary disk 1 and a plurality of non-transmitting parts 14 which do not transmit incident light to the rotary disk 1. These light transmitting parts 13 and non-transmitting parts 14 are alternately arranged in the circumferential direction about the rotation axis R. Note that, the hatched parts in FIG. 2 correspond to parts which do not transmit incident light to the rotary disk 1, and include the above non-transmitting parts 14. The same is true in the later explained FIG. 5.

Figure 3:
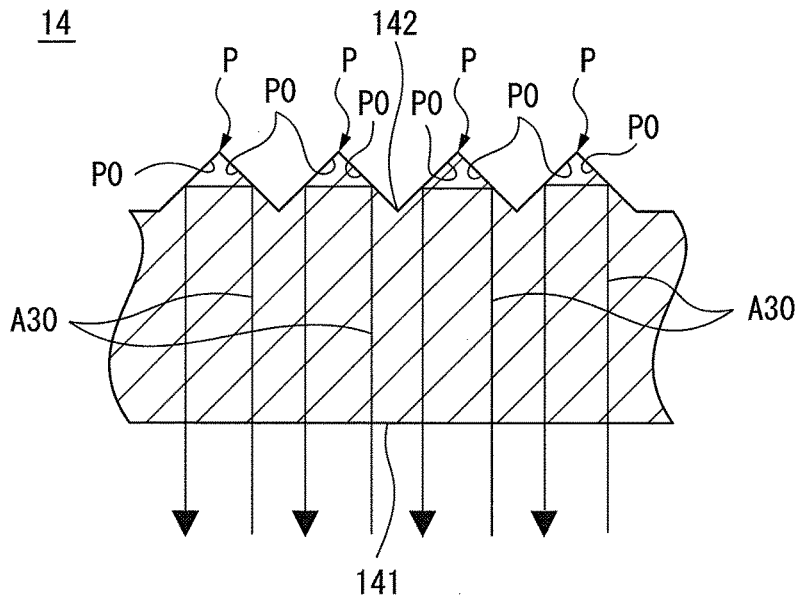
FIG. 3 is a cross-sectional view along the line III-III in FIG. 2.

Next, the structure of each non-transmitting part 14 at the tracks of the rotary disk 1 will be explained. FIG. 3 is a cross-sectional view along the line in FIG. 2. As shown in FIG. 3, a non-transmitting part 14 of the track Ta in the present example has a plurality of V-shaped projecting parts P which are arranged in the circumferential direction of the rotary disk 1 (that is, in the left-right direction in FIG. 3). More specifically, a non-transmitting part 14 of the present example has a planar bottom surface 141 and a corrugated top surface 142 which is provided with the above-mentioned plurality of projecting parts P. The bottom surface 141 of a non-transmitting part 14 forms part of the bottom surface of the rotary disk 1, while the top surface 142 of a non-transmitting part 14 forms part of the top surface 12 of the rotary disk 1. As shown in FIG. 3, each of the plurality of projecting parts P has the shape of a triangular prism which extends in the radial direction of the rotary disk 1 (that is, direction vertical to cross-section in FIG. 3).

Further, each of the plurality of projecting parts P has a pair of reflecting surfaces P0 which retro reflect incident light to the bottom surface of the non-transmitting part 14 toward the light emitting part 2. The pair of reflecting surfaces P0 form parts of the top surface 142 of the non-transmitting part 14. Note that, the "retro reflection" referred to herein means reflecting emitted light from the light emitting part 2 so that its progression direction is inverted. As shown in FIG. 3, each surface of the pair of reflecting surfaces P0 is slanted with respect to the bottom surface 141 of the non-transmitting part 14 at a predetermined angle. More specifically, one of the reflecting surfaces P0 is slanted at an angle which totally reflects the incident light to the bottom surface 141 toward the other reflecting surface P0 (see FIG. 3, right side reflecting surface P0). The route of the incident light to the bottom surface 141 of the non-transmitting part 14 is indicated by the arrow A30 in the figure. Further, the other reflecting surface P0 is slanted at an angle which totally reflects the totally-reflected light at the one reflecting surface P0 toward the bottom surface 141 (see FIG. 3, left side reflecting surface P0).

In this way, emitted light from the light emitting part 2 enters the bottom surface 141 of a non-transmitting part 14, and is then totally reflected at the pair of reflecting surfaces P0 of each projecting part P (see FIG. 3, arrow A30). Further, the reflected light at the pair of reflecting surface P0 proceeds in the opposite direction to that of the incident light to the bottom surface 141, and then exits from the bottom surface 141 (see FIG. 3, arrow A30). That is, when a non-transmitting part 14 of the track Ta is positioned directly above the light emitting part 2, the emitted light from the light emitting part 2 is retro reflected at the reflecting surfaces P0 of the V-shaped projecting parts P and returns to the same light emitting part 2. On the other hand, each light transmitting part 13 of the track Ta of the present example has a planar bottom surface and top surface, and therefore incident light to the bottom surface exits from the light transmitting part 13 without being reflected at the top surface. For this reason, when a light transmitting part 13 of the track Ta is positioned directly above the light emitting part 2, the emitted light from the light emitting part 2 exits from the top surface of the light transmitting part 13 and reaches a light receiving part 3. Note that, the light transmitting parts 13 and non-transmitting parts 14 of the other tracks Tb1, Tb2 in FIG. 2 have structures similar to the light transmitting parts 13 and non-transmitting parts 14 of the above-mentioned track Ta.

Referring again to FIG. 2, the plurality of tracks T of the rotary disk 1 include a track Ta which has a pattern where light transmitting parts 13 and non-transmitting parts 14 are arranged periodically in the circumferential direction, and two tracks Tb1, Tb2 which have patterns where light transmitting parts 13 and non-transmitting parts 14 are arranged non-periodically in the circumferential direction. Below, a track with the former pattern may be referred to as a "periodic track", while a track with the latter pattern may be referred to as a "non-periodic track". As shown in FIG. 2, one non-periodic track Tb1 is positioned at the inside of the periodic track Ta in the radial direction, while the other non-periodic track Tb2 is positioned at the outside of the periodic track Ta in the radial direction. Below, the non-periodic track Tb1 at the inner position in the radial direction may be referred to as "the first non-periodic track Tb1", while the non-periodic track Tb2 at the outer position in the radial direction may be referred to as "the second non-periodic track Tb2".

Figure 6:
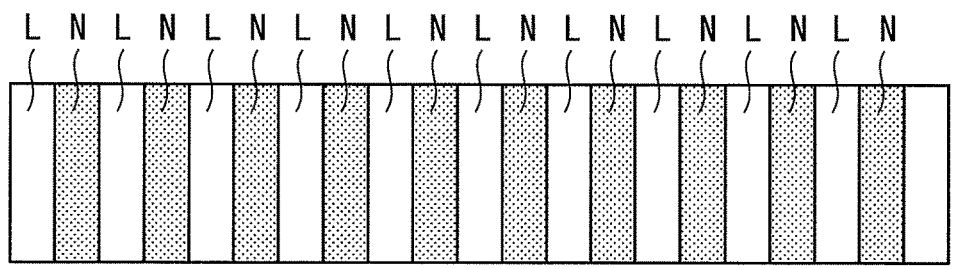
FIG. 6 is a schematic view which shows one example of a periodic pattern of light transmitting parts and non-transmitting parts at an optical track.
Figure 7:
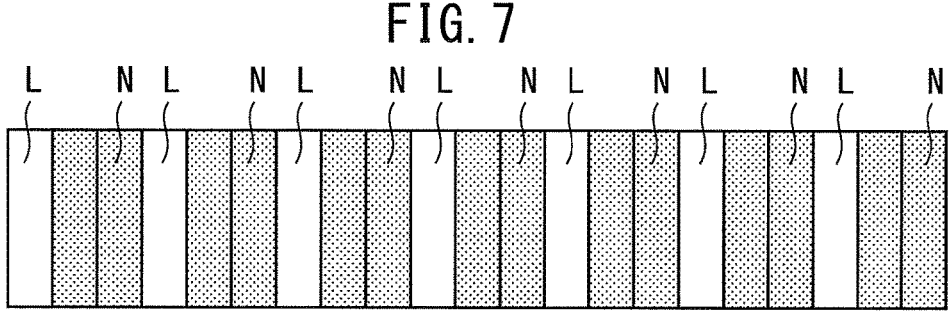
FIG. 7 is a schematic view which shows a first example of a non-periodic pattern of light transmitting parts and non-transmitting parts at an optical track.
Figure 8:
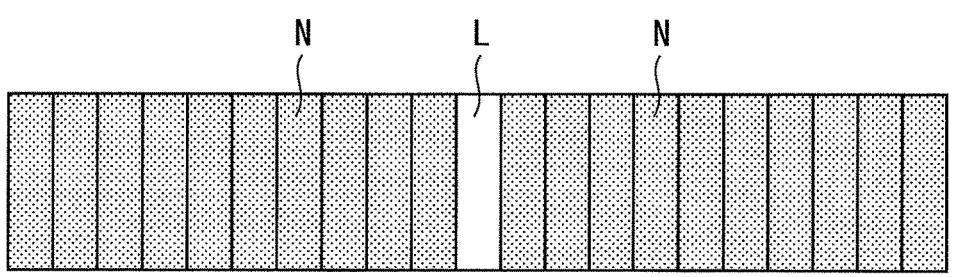
FIG. 8 is a schematic view which shows a second example of a non-periodic pattern of light transmitting parts and non-transmitting parts at an optical track.
Figure 9:
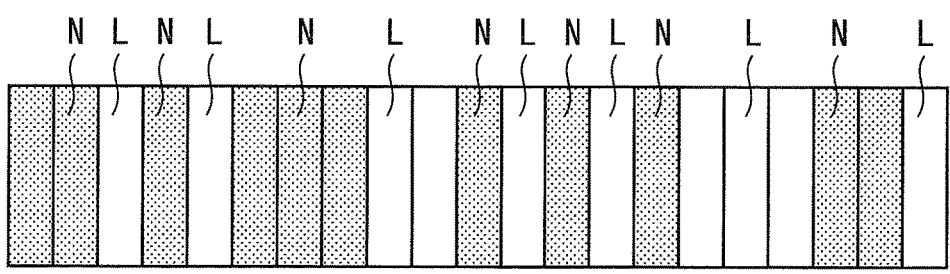
FIG. 9 is a schematic view which shows a third example of a non-periodic pattern of light transmitting parts and non-light transmitting parts at an optical track.

Here, a "periodic pattern" of the light transmitting parts 13 and the non-transmitting parts 14 means a pattern where the light transmitting parts 13 and the non-transmitting parts 14 are alternately arranged at the same duty ratio across the entire length of a track T (for example see FIG. 6). Further, a "non-periodic pattern" of the light transmitting parts 13 and the non-transmitting parts 14 means all patterns except for ones corresponding to the above periodic pattern (for example, see FIG. 7 to FIG. 9). For this reason, a pattern where the light transmitting parts 13 and the non-transmitting parts 14 are not arranged in the same duty ratio falls within a non-periodic pattern instead of a periodic pattern even if the light transmitting parts 13 and the non-transmitting parts 14 are arranged in an orderly fashion (in particular, see FIG. 7). As shown in FIG. 2, the first non-periodic track Tb1 has a pseudo random pattern where non-transmitting parts 14 are scattered at only part of the overall length in the circumferential direction. Similarly, the second non-periodic track Tb2 has a pseudo random pattern where light transmitting parts 13 are scattered at only part of the total length in the circumferential direction.

Figure 4:
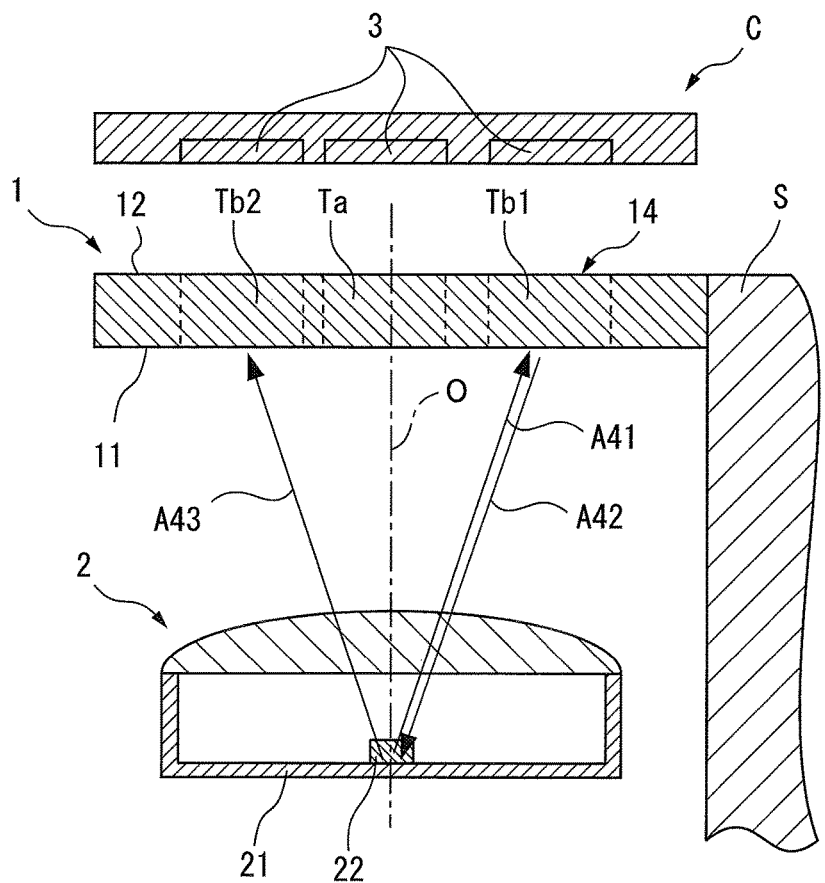
FIG. 4 is a partial enlarged view of a rotary encoder of FIG. 1.

Next, the route of the retro reflected light at a non-transmitting part 14 of each track in the rotary disk 1 will be explained. FIG. 4 is a partial enlarged view of the rotary encoder E of FIG. 1. Below, in particular, the route of retro reflected light at a non-transmitting part 14 of the first non-periodic track Tb1 will be explained. The arrow mark A41 in FIG. 4 indicates the route of the emitted light from the light emitting part 2 toward the first non-periodic track Tb1, while the arrow mark A42 in FIG. 4 indicates the route of the retro reflected light at the first non-periodic track Tb1. Further, the imaginary line in FIG. 4 indicates the optical axis O of the light emitting part 2. As will be understood from the arrow marks A41 and A42, due to the retro reflection at a non-transmitting part 14 of the first non-periodic track Tb1, the progression direction of emitted light from the light emitting part 2 is inverted (that is, is rotated 180°). That is, the retro reflected light at a non-transmitting part 14 travels the route of the indent light in the opposite direction to return to the light emitting part 2.

As explained above, the light emitting part 2 of the present example is formed by a metal housing 21 called a "metal can package" and a light emitting diode 22 which is arranged inside of the housing 21. For this reason, the retro reflected light at a non-transmitting part 14, as shown by the arrow mark A42, enters the inside of the housing 21. Further, the housing 21 of the present example includes a material which easily reflects light, and therefore the light which enters inside of the housing 21 is reflected at the inside surface of the housing 21 to exit from the light emitting part 2. The route of the thus exiting light is indicated by the arrow mark A43 in FIG. 4. As will be understood from the arrow marks A42, A43, the route of the light after reflection at the light emitting part 2 is in linear symmetric with the route of the light before reflection with respect to the optical axis O of the light emitting part 2. If the light reflected at the above-mentioned light emitting part 2 enters the periodic track Ta of the rotary disk 1, a modulated signal corresponding to the periodic track Ta will be superposed, and therefore the detection precision of the rotational angle will be deteriorated.

In order to suppress such deterioration of the detection precision, the plurality of tracks T of the rotary disk 1 of the present example have a predetermined positional relationship in the radial direction of the rotary disk 1. More specifically, the plurality of tracks T of the present example are respectively arranged in the radial direction so that the further reflected light at the light emitting part 2 after retro reflection at a non-transmitting part 14 of the first non-periodic track Tb1 will not enter the periodic track Ta. For example, the plurality of tracks T can be respectively arranged in the radial direction so that the further reflected light at the light emitting part 2 after retro reflection at a non-transmitting part 14 of the first non-periodic track Tb1 will enter the second non-periodic track Tb2. In this way, in the rotary encoder E of the present example, retro reflected light at the first non-periodic track Tb1 never enter the periodic track Ta, and therefore the retro reflected light never causes superposition of a modulated signal corresponding to the periodic track Ta. Therefore, according to the rotary encoder E of the present example, it is possible to suppress deterioration of the detection precision due to superposition of a modulated signal corresponding to the periodic track Ta.

Further, in the rotary disk 1 of the present example, the plurality of tracks T are respectively arranged in the radial direction of the rotary disk 1 so that the further reflected light at the light emitting part 2 after retro reflection at a non-transmitting part 14 of the second non-periodic track Tb2 will not enter the periodic track Ta. For example, the plurality of tracks T may be arranged in the radial direction so that the further reflected light at the light emitting part 2 after retro reflection at a non-transmitting part 14 of the second non-periodic track Tb2 will enter the first non-periodic track Tb1. In this way, in the rotary encoder E of the present example, retro reflected light at the second non-periodic track Tb2 never enters the periodic track Ta, and therefore the retro reflected light never causes superposition of a modulated signal corresponding to the periodic track Ta. Therefore, according to the rotary encoder E of the present example, it is possible to further suppress deterioration of the detection precision due to superposition of a modulated signal corresponding to the periodic track Ta. Note that, in the rotary encoder E of the present example, further reflected light at the light emitting part 2 after retro reflection at the periodic track Ta may enter the same periodic track Ta. However, the detection error due to retro reflected light at the periodic track Ta can be corrected by a known processing system such as disclosed in JP2003-254785A.

Figure 5:
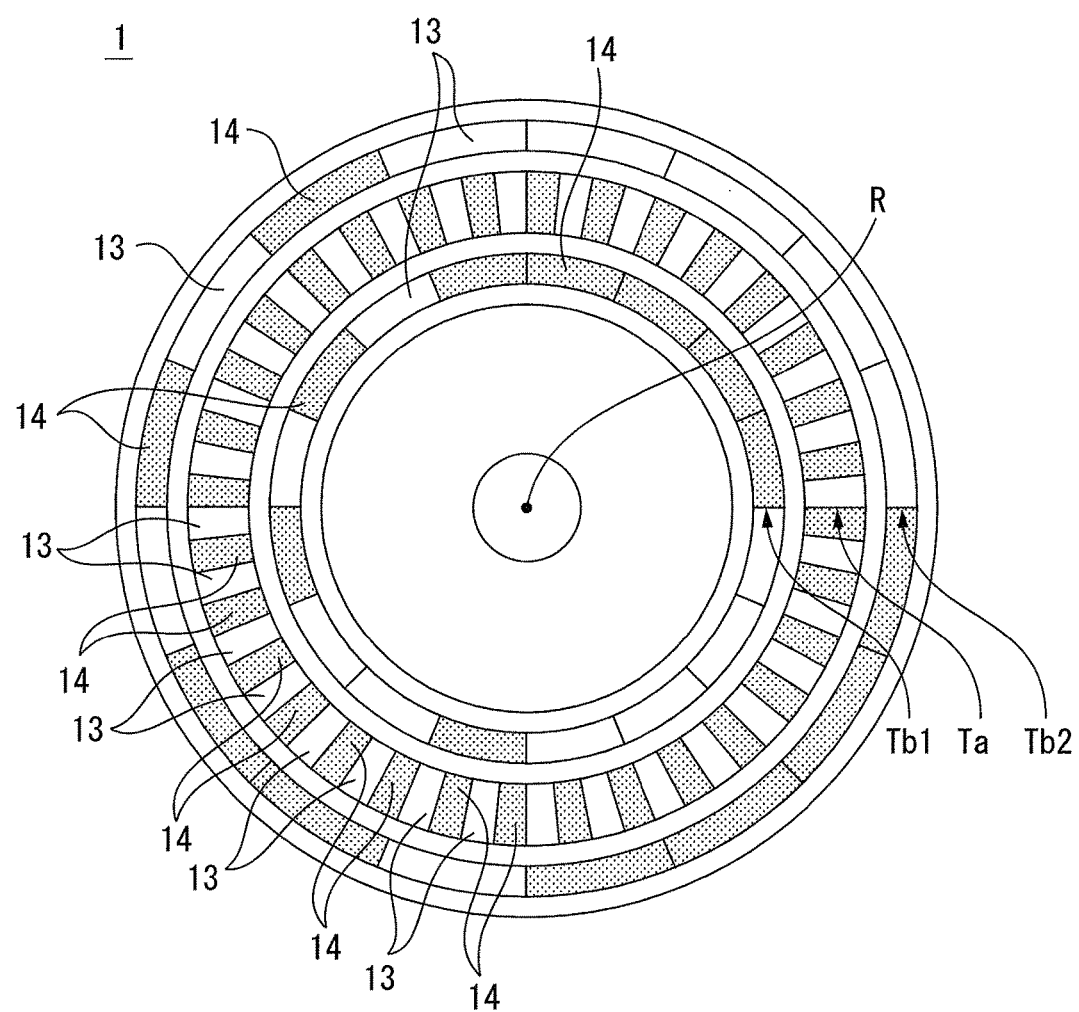
FIG. 5 is a top view, similar to FIG. 2, which shows a modification of a rotary disk in a rotary encoder of the present embodiment.

Next, a modification of the above-mentioned rotary disk 1 will be explained. FIG. 5 is a top view, similar to FIG. 2, which shows a modification of the rotary disk 1 in the rotary encoder E of the present embodiment. The rotary disk 1 of the present example, in the same way as the example of FIG. 2, has a plurality of tracks T which extend concentrically about a rotation axis R. The plurality of tracks T according to the present example, in the same way as the example of FIG. 2, include one periodic track Ta which has a pattern where light transmitting parts 13 and non-transmitting parts 14 are periodically arranged, a first non-periodic track Tb1 which is arranged at an inside from the periodic track Ta in the radial direction, and a second non-periodic track Tb2 which is arranged at an outside from the periodic track Ta in the radial direction. The structures of the individual light transmitting parts 13 and non-transmitting parts 14 at the tracks T are similar to the example of FIG. 2 (see FIG. 3).

Referring to FIG. 5, in the rotary disk 1 of the present example, the periodic track Ta has the form of an incremental track, while each of the first and second non-periodic tracks Tb1, Tb2 has the form of an absolute track. Normally, an "incremental track" means an optical track for generating modulated light which forms the basis for an electrical signal to be processed at the circuit part as an incremental signal. A general incremental track has a pattern of light transmitting parts and non-transmitting parts which are periodically arranged so as to output a continuous sinusoidal electrical signal over the time period when that rotary disk rotates once. Further, an "absolute track" means an optical track for generating modulated light which forms the basis for an electrical signal to be processed at the circuit part as an absolute signal. A general absolute track has a pattern of light transmitting parts and non-transmitting parts which are non-periodically arranged like a M-sequence pseudo random pattern, a gray code pattern, or an origin detection pattern where only one pulse is outputted over the time period when the rotary disk rotates once.

Here, the method of processing the absolute signal and incremental signal at the circuit part C of the rotary encoder E of the present embodiment will be explained. At the circuit part C of the present example, the absolute signal and incremental signal are respectively subjected to the following processing: First, the absolute signal is subjected to simple processing such as determination of the high/low level by means of a comparator of the circuit part C. On the other hand, the incremental signal is subjected to complicated processing such as AD conversion by means of an AD (analog-to-digital) converter of the circuit part. For this reason, generating a higher quality incremental signal will contribute to improvement of the detection precision of the rotational angle.

In the rotary disk 1 of FIG. 5, the plurality of tracks T have a predetermined positional relationship in the radial direction, in the same way as the example of the above-mentioned FIG. 2. For convenience, below, the periodic track Ta may be called an "incremental track Ta" while the first and second non-periodic tracks Tb1, Tb2 may respectively be called the "first and second absolute tracks Tb1, Tb2". More specifically, the plurality of tracks T of the present example are arranged in the radial direction so that further reflected light at the light emitting part 2 after retro reflection at a non-transmitting part 14 of the first absolute track Tb1 will not enter the incremental track Ta. For example, the plurality of tracks T can be arranged in the radial direction so that further reflected light at the light emitting part 2 after retro reflection at a non-transmitting part 14 of the first absolute track Tb1 will not enter the second absolute track Tb2. In this way, in a rotary encoder E which is provided with a rotary disk 1 of the present example, retro reflected light at the first absolute track Tb1 will never enter the incremental track Ta, and therefore the retro reflected light will never cause superposition of a modulated signal corresponding to the incremental track Ta. Therefore, according to the rotary encoder E which is provided with the rotary disk 1 of the present example, it is possible to suppress deterioration of the detection precision which may be caused by superposition of a modulated signal corresponding to the incremental track.

Further, in the rotary disk 1 of FIG. 5, the plurality of tracks T are respectively arranged in the radial direction of the rotary disk 1 so that the further reflected light at the light emitting part 2 after retro reflection at a non-transmitting part 14 of the second absolute track Tb2 will not enter the incremental track Ta. For example, the plurality of tracks T can be arranged in the radial direction so that the further reflected light at the light emitting part 2 after retro reflected at a non-transmitting part 14 of the second absolute track Tb2 will enter the first incremental track Tb1. In this way, in the rotary encoder E which is provided with the rotary disk 1 of the present example, the retro reflected light at the second absolute track Tb2 will never enter the incremental track Ta, and therefore the retro reflected light will never cause superposition of a modulated signal corresponding to the incremental track Ta. Therefore, according to the rotary encoder E which is provided with the rotary disk 1 of the present example, it is possible to further suppress deterioration of the detection precision which may be caused by superposition of a modulated signal corresponding to the incremental periodic track.

As explained above, according to the rotary disk 1 of FIG. 5, the retro reflected light from the first absolute track Tb1 may enter the second absolute track Tb2. Similarly, the retro reflected light at the second absolute track Tb2 may enter the first absolute track Tb1. However, even if retro reflected light enters the first or second absolute track Tb1, Tb2, it is expected that such retro reflected light makes a small impact on the detection precision of the rotational speed. The reason is as follows: The modulated light which is output from the first or second absolute track Tb1, Tb2, as explained above, is used for determination of the high/low level by means of the comparator of the circuit part C, but a certain degree of margin is usually set for the threshold value of the high/low level. For this reason, even if retro reflected light enters the first or second absolute track Tb1, Tb2, there is a small possibility of erroneous determination of the high/low level.

In the above way, according to the rotary encoder E of the present embodiment, it is possible to prevent retro reflected light at the first or second non-periodic track Tb1, Tb2 from causing superposition of a modulated signal corresponding to the periodic track Ta, and therefore it is possible to suppress deterioration of the detection precision which may be caused by superposition of a modulated signal corresponding to the periodic track Ta. In particular, according to the rotary encoder E of the present embodiment, if retro reflected light at the first or second non-periodic track Tb1, Tb2 is symmetrically reflected with respect to the optical axis O of the light emitting part 2, it is possible to prevent the retro reflected light from causing the occurrence of superposition of a modulated signal corresponding to the periodic track Ta. Therefore, even if the light emitting part 2 includes a part like a metal can package which easily reflects light, it is possible to suppress deterioration of the detection precision which may be caused by superposition of a modulated signal corresponding to the periodic track. Further, according to the rotary encoder E of the present embodiment, the rotary disk 1 is formed from a plastic material which has a light transmitting ability, and therefore it is possible to eliminate the steps of vapor deposition and etching of a metal material. Furthermore, even if the non-transmitting parts 14 at each track of the rotary disk 1 have complicated shapes, it is possible to produce the rotary disk 1 in an inexpensive and easy manner, using plastic forming art such as injection molding.

Effect of Invention

According to the first aspect of the present invention, it is possible to prevent retro reflected light at a non-periodic track from causing superposition of a modulated signal corresponding to a periodic track, and therefore it is possible to suppress deterioration of the detection precision which may be caused by superposition of a modulated signal corresponding to a periodic track.

According to the second aspect of the present invention, if retro reflected light at a non-periodic track is symmetrically reflected with respected to an optical axis of the light emitting part, it is possible to prevent the retro reflected light from causing superposition of a modulated signal corresponding to a periodic track. Therefore, according to the second aspect, even if the light emitting part includes a part which can easily reflect light such as a metal can package, it is possible to suppress deterioration of the detection precision which may be caused by superposition of a modulated signal corresponding to a periodic track.

According to the third and fourth aspects of the present invention, even if the rotary disk has two non-periodic tracks, it is possible to prevent retro reflected light at these non-periodic tracks from causing superposition of a modulated signal corresponding to a periodic track. Therefore, according to the third and fourth aspects, even if the rotary disk has two non-periodic tracks, it is possible to suppress deterioration of the detection precision which may be caused by superposition of a modulated signal corresponding to a periodic track.

According to the fifth aspect of the present invention, it is possible to prevent the occurrence of superposition of a modulated signal corresponding to an optical track for incremental signal, and therefore it is possible to prevent retro reflected light at the optical track for absolute signal from causing deterioration of the detection precision which may be caused by superposition of a modulated signal corresponding to an optical track for incremental signal.

According to the sixth aspect of the present invention, even if the non-transmitting parts at each track of the rotary disk have complicated shapes, it is possible to produce the rotary disk in an expensive and easy manner, using plastic molding art such as injection molding.

The present invention is not limited to only the above embodiment and can be modified in various ways within the scope which is described in the claims. For example, the rotary disk 1 of the rotary encoder E of the above embodiment has one periodic track Ta and two non-periodic tracks Tb1, Tb2, but the rotary disk of the rotary encoder of the present invention may also have two or more periodic tracks and may also have one or three or more non-periodic tracks. Further, the arrangements of the light transmitting parts and non-transmitting parts in each track of the rotary encoder of the present invention are not limited to those which are shown in FIG. 2 and FIG. 5. Further, the structures of the non-transmitting parts in each track of the rotary encoder of the present invention, in particular the numbers, shapes, arrangements, etc. of the projecting parts, are not limited to those which are shown in FIG. 3. Furthermore, the dimensions, shapes, materials, etc. which are described in the above embodiments are only an example.

Various dimensions, shapes, materials, etc. can be employed to achieve the effects of the present invention.

The invention claimed is:

1. A rotary encoder comprising
a rotary disk which has a rotation axis, and
a light emitting part which emits light toward said rotary disk, wherein
said rotary disk has a plurality of tracks which extend concentrically about said rotation axis,
each of said plurality of tracks has light transmitting parts which transmit incident light to said rotary disk and non-transmitting parts which do not transmit incident light to said rotary disk, said light transmitting parts and said non-transmitting parts being arranged alternately in a circumferential direction about said rotation axis,
said non-transmitting parts have pluralities of projecting parts which are arranged along said circumferential direction of said rotary disk, each of said plurality of projecting parts having a pair of reflecting surfaces which retro reflect incident light to said rotary disk toward said light emitting part,
said plurality of tracks include a periodic track where said light transmitting parts and said non-transmitting parts are arranged in said circumferential direction with a periodic pattern and a non-periodic track where said light transmitting parts and said non-transmitting parts are arranged in said circumferential direction with a non-periodic pattern,
said periodic track and said non-periodic track are arranged in a radial direction of said rotary disk at positions where further reflected light at said light emitting part after retro reflection at said reflecting surfaces of said non-periodic track will not enter said periodic track,
said plurality of tracks further include a second non-periodic track where said light transmitting parts and said non-transmitting parts are arranged in said circumferential direction with a non-periodic pattern,
said periodic track is arranged in said radial direction between said non-periodic track and said second non-periodic track, and
said periodic track and said second non-periodic track are arranged in said radial direction at positions where further reflected light at said light emitting part after retro reflection at said reflecting surfaces of said second non-periodic track will not enter said periodic track.

2. The rotary encoder according to claim 1, wherein
said light emitting part has a housing which holds a light emitting diode, and
said housing has a surface which symmetrically reflects retro reflected light at said reflecting surfaces of said non-periodic track with respect to an optical axis of said light emitting part.

3. The rotary encoder according to claim 1, wherein
said periodic track, said non-periodic track, and said second non-periodic track are arranged in said radial direction so that further reflected light at said light emitting part after retro reflection at said reflecting surfaces of any one of said non-periodic track and said second non-periodic track will enter the other of said non-periodic tracks.

4. The rotary encoder according to claim 1, wherein
said periodic track is an optical track for an incremental signal, and said non-periodic track is an optical track for an absolute signal.

5. The rotary encoder according to claim 1, wherein
said rotary disk is formed from a plastic material which has a light transmitting ability.

* * * * *